United States Patent
Nakamura (10) Patent No.: US 12,435,999 B2
(45) Date of Patent: Oct. 7, 2025

(54) STEERING DEVICE

(71) Applicant: HONDA MOTOR CO., LTD., Tokyo (JP)

(72) Inventor: Kotaro Nakamura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 186 days.

(21) Appl. No.: 18/359,879

(22) Filed: Jul. 27, 2023

(65) Prior Publication Data

US 2024/0035860 A1    Feb. 1, 2024

(51) Int. Cl.
*G01D 5/24*    (2006.01)
*B62D 1/04*    (2006.01)
*G01R 27/26*    (2006.01)

(52) U.S. Cl.
CPC .................. *G01D 5/24* (2013.01); *B62D 1/04* (2013.01); *G01R 27/2605* (2013.01)

(58) Field of Classification Search
CPC .. G01D 5/00; G01D 5/12; G01D 5/14; G01D 5/24; G01D 5/2405; B62D 1/00; B62D 1/02; B62D 1/04; B62D 1/046; B62D 1/06; B60R 16/00; B60R 16/02; G01R 27/00; G01R 27/02; G01R 27/026; G01R 27/2605
USPC ................................ 324/600, 649, 658, 686
See application file for complete search history.

(56) References Cited

U.S. PATENT DOCUMENTS

| | | | | |
|---|---|---|---|---|
| 11,150,113 B2 * | 10/2021 | Kunieda | ................. | G01D 5/241 |
| 11,198,462 B2 * | 12/2021 | Trachte | ................. | G06F 3/0447 |
| 12,103,581 B2 * | 10/2024 | Kondo | ................... | H05K 9/009 |
| 2014/0277951 A1 | 9/2014 | Kim | | |
| 2017/0088066 A1 * | 3/2017 | Wang | ................... | B60R 16/027 |
| 2018/0118247 A1 | 5/2018 | Odate | | |

FOREIGN PATENT DOCUMENTS

| | | | | |
|---|---|---|---|---|
| DE | 102007020936 A1 | 12/2008 | | |
| EP | 3103701 A1 * | 12/2016 | ............. | B62D 1/046 |
| EP | 3838717 A1 * | 6/2021 | ........... | B60R 16/027 |
| JP | 2008087566 A | 4/2008 | | |
| JP | 2018039478 A | 3/2018 | | |

(Continued)

OTHER PUBLICATIONS

Notification of Reasons for Refusal issued Aug. 12, 2025 in the JP Patent Application No. 2022-120626.

*Primary Examiner* — Hoai-An D. Nguyen
(74) *Attorney, Agent, or Firm* — CKC & Partners Co., LLC (57) ABSTRACT

A steering device (1) includes: a steering wheel (2); a plurality of proximity sensors (4, 5, 6, 7) which are arranged on a rim part (20) of the steering wheel (2), and output detection values (Ch_1, Ch_2, Ch_3, Ch_4) that vary according to distance between each arrangement position and the human body; and a grip determination device (8) which determines the presence/absence of gripping of the rim part (20) based on the detection values (Ch_1 to Ch_4) of the proximity sensors (4 to 7). The grip determination device (8) includes a selector (81) which selects a target sensor from among the plurality of proximity sensors (4 to 7) based on a change extent of detection values of the plurality of proximity sensors (4 to 7); and a determinator (82) which determines the presence/absence of gripping of the rim part (20) based on the detection value of the target sensor.

17 Claims, 5 Drawing Sheets

(56) References Cited

FOREIGN PATENT DOCUMENTS

| | | | | |
|---|---|---|---|---|
| JP | 2018069902 A | | 5/2018 | |
| JP | 2018109852 A | | 7/2018 | |
| JP | 2019051783 A | * | 4/2019 | ............... B62D 1/04 |
| KR | 20220047037 A | * | 4/2022 | ............. B60R 16/02 |

* cited by examiner

STEERING DEVICE

This application is based on and claims the benefit of priority from Japanese Patent Application No. 2022-120626, filed on 28 Jul. 2022, the content of which is incorporated herein by reference.

BACKGROUND OF THE INVENTION

Field of the Invention

The present invention relates to a steering device. In more detail, the present invention relates to a steering device including a steering wheel, and a grip determination device that determines the presence/absence of gripping of the steering wheel by the driver.

Related Art

In recent years, the equipping to vehicles of driving assistance devices which assist driving of a vehicle by the driver, such as a lane maintaining function, lane deviation suppressing function, lane change function and preceding vehicle following function has been advancing. With a vehicle equipped with such driving assistance devices, for example, in a case of determining the presence/absence of gripping of the steering wheel by the driver by way of a grip determination device such as that shown in Patent Document 1, and determining as not being gripped, gripping of the steering wheel may be prompted to the driver, or the driving assistance function may be cancelled while traveling.

With the grip determination device shown in Patent Document 1, the presence/absence of gripping of the steering wheel by the driver is determined based on the detection value of a proximity sensor provided to the rim part of the steering wheel.

Patent Document 1: Japanese Unexamined Patent Application, Publication No. 2018-69902

SUMMARY OF THE INVENTION

However, in the case of determining the presence/absence of gripping of the steering wheel based on the detection value of a proximity sensor provided to the rim part as in the grip determination device shown in Patent Document 1, when a part of the body of the driver other than a hand is present in the vicinity of the steering wheel, it may misjudge as gripping irrespective of the driver not gripping the rim part by hand. More specifically, as the body build of the driver becomes larger, since the gap between the steering wheel and the abdomen or knees becomes narrow, such misjudgment tends to occur.

The present invention has an object of providing a steering device which can determine the presence/absence of gripping of the steering wheel appropriately irrespective of the body build of the driver.

A steering device (for example, the steering device 1 described later) according to a first aspect of the present invention includes: a steering wheel (for example, the steering wheel 2 described later) which accepts a steering operation of a vehicle by a driver; a plurality of proximity sensors (for example, the first proximity sensor 4, second proximity sensor 5, third proximity sensor 6 and fourth proximity sensor 7 described later) which is disposed to a grip part (for example, the rim part 20 described later) of the steering wheel which can be gripped by the driver, and outputs a detection value that varies according to a distance between each arrangement position and a human body; and a grip determination device (for example, the grip determination device 8 described later) which determines a presence of gripping of the grip part based on the detection value of the proximity sensors, in which the grip determination device includes: a selector (for example, the selector 81 described later) that selects a target sensor from among the plurality of the proximity sensors based on a change extent of the detection value of the plurality of the proximity sensors; and a determinator (for example, the determinator 82 described later) that determines a presence of gripping of the grip part based on the detection value of the target sensor.

According to a second aspect of the present invention, in this case, it is preferable for the selector to select the target sensor by mutually comparing magnitudes of a change extent of a detection value of the plurality of the proximity sensors.

According to a third aspect of the present invention, in this case, it is preferable for the selector to select, as the target sensor, an $M^{th}$ (M is an integer of 1 or greater and less than N) in descending order from proximity sensors having a large change extent among N-number (N is an integer of 2 or greater) of the proximity sensors.

According to a fourth aspect of the present invention, in this case, it is preferable for the selector to select the target sensor by comparing a change extent of a detection value of the plurality of the proximity sensors with a selection threshold, which is a threshold decided for this change extent.

According to a fifth aspect of the present invention, in this case, it is preferable for the selector to select a proximity sensor having a change extent greater than the selection threshold among the plurality of the proximity sensors as the target sensor.

According to a sixth aspect of the present invention, in this case, it is preferable for the selector to execute selection processing of selecting the target sensor from the plurality of the proximity sensors in a predetermined cycle, while the determinator is determining that the grip part is not being gripped.

According to a seventh aspect of the present invention, in this case, it is preferable for the determinator to determine presence of gripping of the grip part every predetermined cycle; determine presence of gripping of the grip part based on a detection value of only a proximity sensor selected as the target sensor among the plurality of the proximity sensors, in a case of determining that the grip part is not being gripped during a previous cycle; and determine presence of gripping of the grip part based on the detection values of the plurality of the proximity sensors, in a case of determining that the grip part is being gripped during a previous cycle.

According to a eighth aspect of the present invention, in this case, it is preferable for the determinator to determine that the grip part is being gripped, in a case of a detection value of the target sensor being at least a grip threshold, which is a threshold decided for this detection value.

According to a ninth aspect of the present invention, in this case, it is preferable for the determinator to determine that the grip part is being gripped, in a case of a total value of detection values of the plurality of the proximity sensors being at least a grip threshold, which is a threshold decided for this detection value.

In the first aspect of the present invention, a plurality of proximity sensors are provided to a grip part of the steering wheel which can be gripped by the driver. Herein, in the case of the body build of the driver being larger than standard, a part of the body such as the abdomen or knees of the driver sitting in the driver seat may contact a specified location of the grip part. For this reason, the detection value of the proximity sensor arranged in the vicinity of this specified location becomes steadily larger than reference; however, it does not charge greatly while driving. In contrast, the detection value of a proximity sensor arranged in the vicinity of a location where the driver grips by hand greatly changes every time the driver grips. Therefore, the selector of the grip determination device selects a target sensor from among the plurality of proximity sensors based on the change extent of the detection values of the plurality of proximity sensors, and the determinator of the grip determination device determines the presence/absence of gripping based on the detection value of the selected target sensor. According to the present invention, since it is possible to exclude from being the target sensor a sensor for which the detection value increased due to the body build of the driver from among the plurality of proximity sensors, it is possible to determine the presence/absence of gripping of the steering wheel appropriately, irrespective of the body build of the driver, and consequently can improve traffic safety.

In the second aspect of the present invention, the selector can select, as the target sensor, a sensor arranged in the vicinity of the location gripped by hand by the driver from among the plurality of proximity sensors, by selecting a target sensor from the plurality of proximity sensors by mutually comparing the magnitudes of the change extent of the detection values of the plurality of proximity sensors.

In the third aspect of the present invention, the selector can select, as the target sensor, a sensor arranged in the vicinity of the location gripped by hand by the driver from among the plurality of proximity sensors, by selecting the Mtn in descending order from sensors having a large change extent among the N-number of proximity sensors as the target sensor.

In the fourth aspect of the present invention, the selector can select, as the target sensor, a sensor arranged in the vicinity of the location gripped by hand by the driver from among the plurality of proximity sensors, by selecting the target sensor from among the plurality of proximity sensors by comparing the change extent of the detection values of the plurality of proximity sensors with the selection threshold, which is a threshold decided for this change extent.

In the fifth aspect of the present invention, the selector can select, as the target sensor, a sensor arranged in the vicinity of the location gripped by hand by the driver from among the plurality of proximity sensors, by selecting sensors among the plurality of proximity sensors having the change extent greater than the selection threshold, as the target sensor.

In the sixth aspect of the present invention, the selector can re-select the appropriate target sensor, every time the driver grips the grip part again, and changes the grip location, by executing in a predetermined cycle the selection processing of selecting a target sensor from among the plurality of proximity sensors, while determined by the determinator as not being gripped.

In the seventh aspect of the present invention, the determinator can accurately determine the presence/absence of gripping by the driver, by determining the presence/absence of gripping of the grip part based on the detection value of only one selected as the target sensor by the selector, in the case of determining the presence/absence of gripping of the grip part every predetermined cycle, and determining as not being gripped during the previous cycle. In addition, the determinator, in the case of determining as being gripped during the previous cycle, can determine the presence/ absence of gripping appropriately, even in the case of the driver sliding the gripping location thereof while gripping the grip part, for example, by determining the presence/ absence of gripping of the grip part based on the detection values of the plurality of proximity sensors.

In the eighth aspect of the present invention, the determinator can accurately determine that the driver is gripping the vicinity of an arrangement position of the target sensor, by determining that the grip part is being gripped, in the case of the detection value of the target sensor being at least the grip threshold, which is a threshold decided for this detection value.

In the ninth aspect of the present invention, the determinator determines that the grip part is being gripped, in the case of the total value of detection values of the plurality of target sensors being at least a grip threshold, which is a threshold decided for this detection value. For example, it is thereby possible to accurately determine the presence/absence of gripping, even if the driver is gripping across the arrangement locations of the plurality of proximity sensors.

DETAILED DESCRIPTION OF THE INVENTION

Hereinafter, a steering device according to an embodiment of the present invention will be explained while referencing the drawings.

Figure 1:
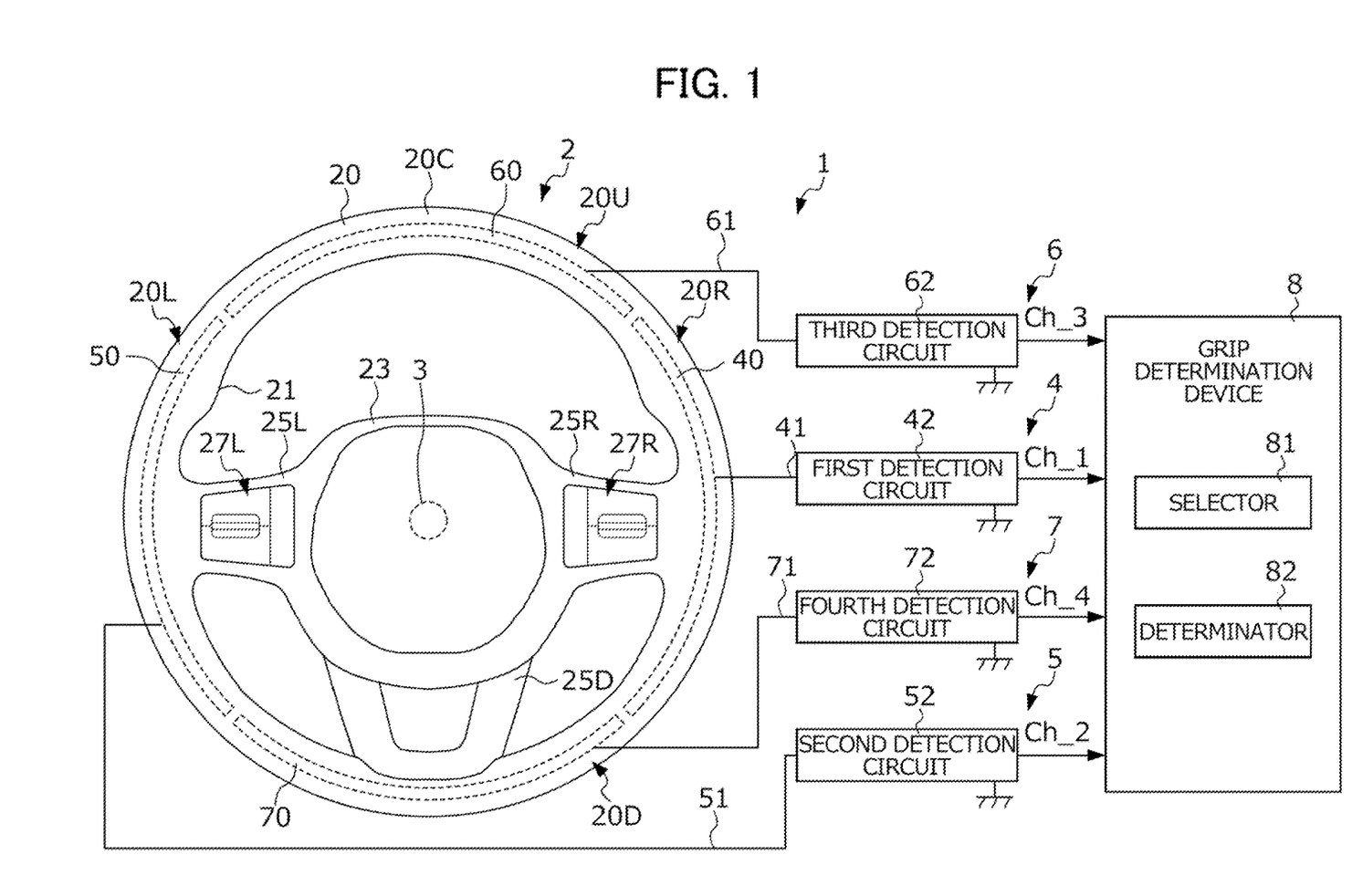
FIG. 1 is a view showing the configuration of a steering device according to an embodiment of the present invention.

FIG. 1 is a view showing the configuration of a steering device 1 according to the present embodiment. The steering device 1 is equipped to a vehicle which is not shown. The steering device 1 includes: a steering wheel 2 which accepts steering operation of the vehicle by the driver and auxiliary device operation related to a vehicle auxiliary device; a steering shaft 3 that pivotally supports this steering wheel 2; a plurality (four in the present embodiment) of proximity sensors 4, 5, 6, 7 provided to the steering wheel 2; and a grip determination device 8 which determines the presence/ absence of gripping of the steering wheel 2 by the driver based on detection results from these proximity sensors 4 to 7.

The steering wheel 2 includes a rim part 20 as a grip part which can be gripped by the driver and is annular; a hub part 23 provided on the inner side of this rim part 20; and three spoke parts 25L, 25R, 25D connected to a rim inner circumferential part 21 of the rim part 20 extending along the radial direction from the hub part 23.

The hub part 23 is provided at the center of the rim part 20 viewed from the driver, for example, and configures a center of the steering wheel 2. At a back side of the hub part 23 viewed from the driver, a steering shaft 3 which pivotally supports the steering wheel 2 is coupled. The steering shaft 3 is a rod-like coupling member which couples a core, which is the backbone of the hub part 23, and a steering mechanism which constitutes part of the vehicle frame which is not shown. Therefore, the steering torque generated by the driver rotating the steering wheel 2 is transferred to the steering mechanism, which is not shown, by this steering shaft 3.

The rim part 20 and hub part 23 are connected by the three spoke parts 25L, 25R, 25D. The left spoke part 25L extends along the horizontal direction, and connects a portion on the left side of the hub part 23 viewed from the driver, and a portion on the right side of the rim inner circumferential part 21 viewed from the driver. The right sport part 25R extends in parallel with the left spoke part 25L along the horizontal direction, and connects a portion on the right side of the hub part 23 viewed from the driver, and a portion on the right side of the rim inner circumferential direction 21 viewed from the driver. The lower spoke part 25D extends perpendicular to the spoke parts 25L, 25R along the vertical direction, and connects a portion on the lower part of the hub part 23 viewed from the driver, and a portion on a lower part of the rim inner circumferential part 21 viewed from the driver.

In the above way, the rim part 20 is annular viewed from the driver, and the driver can grip over the entire circumference thereof. In addition, electrode parts 40, 50, 60, 70 of the plurality of proximity sensors 4, 5, 6, 7 described later are provided over the entire circumference at this rim part 20.

At the left spoke part 25L and right spoke part 25R, a left auxiliary device operation control unit 27L and a right auxiliary device operation control unit 27R which accept auxiliary device operations from the driver in order for the driver to operate vehicle auxiliary devices, which are not shown (for example, audio deice, car navigation device, etc.), are provided. The driver becomes able to operate the vehicle auxiliary devices by operating a plurality of switches provided to these auxiliary device operation control units 27L, 27R by finger.

It should be noted that, hereinafter, the positions of the substantially circular rim part 20, rim inner circumferential part 21, hub part 23 and steering shaft 3, and orientations of each spoke part 25L, 25R, 25D viewed from the driver may be represented by a clock-wise angle "°" centering around the steering shaft 3, and with the upper end part 20C of the rim part 20 viewed from the driver as a reference. In other words, the right spoke part 25R extends along the orientation of 90°, and connects a 90° portion of the hub part 23 and rim inner circumferential part 21. The lower spoke part 25D extends along an orientation of 180°, and connects a 180° portion of the hub part 23 and rim inner circumferential part 21. In addition, the left spoke part 25L extends along the orientation of 270°, and connects a 270° portion of the hub part 23 and rim inner circumferential part 21.

The first proximity sensor 4 includes a first electrode part 40 provided to the rim part 20, and a first detection circuit 42 electrically connected with this first electrode part 40. The first electrode part 40 is a circular arc shape extending along the rim part 20, and is electrically conductive. The first electrode part 40 is provided to the inner part of the rim part 20. The first electrode part 40 is arranged in a range of about 90° between 45° and 135° of the rim part 20 (i.e. range which can be gripped mainly by the right hand of the driver). It should be noted that, hereinafter, the arrangement position of the first electrode part 40 on the rim part 20 is also referred to as rim right part 20R. The first detection circuit 42 is connected with the first electrode part 40 via a wire 41. The first detection circuit 42 detects electrostatic capacitance between the first electrode part 40 and ground, as a value that varies in response to the distance between the arrangement position of the first electrode part 40 and the human body. The electrostatic capacitance between the first electrode part 40 and ground becomes larger as the distance between the arrangement position of the first electrode part 40 and the human body approaches. The detection value Ch_1 of electrostatic capacitance by the first detection circuit 42 is sent to a grip determination device 8.

Figure 2:
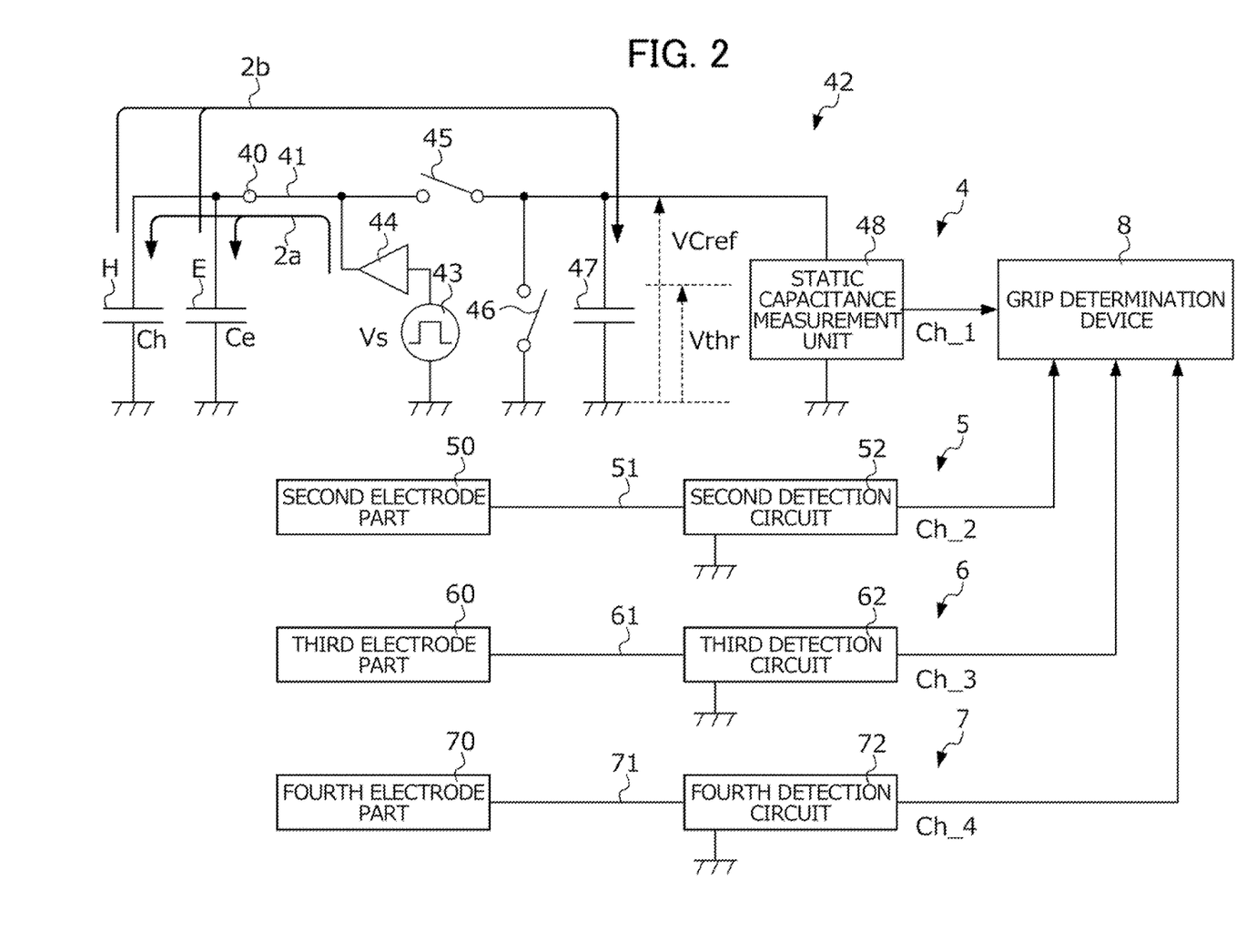
FIG. 2 is a view showing the circuit diagram of a first detection circuit.

FIG. 2 is a view showing the circuit configuration of the first detection circuit 42. The first detection circuit 42 includes a pulse power source 43, amplifier 44, first switch 45, second switch 46, charge capacitor 47, and electrostatic capacitance measurement unit 48. It should be noted that FIG. 2 illustrates the electrostatic capacitance between the first electrode part 40 and ground (for example, vehicle frame) to be divided into electrostatic capacitance Ch formed by the human body H including the hand of the driver operating the steering wheel 2, and the stray capacitance Ce formed by a floating capacitor E of wires, components, etc. excluding the human body H.

As shown in FIG. 2, the pulse power source 43 and amplifier 44 are connected in series. The second switch 46 and charge capacitor 47 are connected in parallel. A series circuit made from the pulse power source 43 and amplifier 44, and the parallel circuit made from the second switch 46 and charging capacitor 47 are connected via the first switch 45. An output terminal of the amplifier 44 and the first switch 45 are connected to the first electrode part 40 via the wire 41. Therefore, the pulse power source 43 is connected to the first electrode part 40 via the amplifier 44 and wire 41. In addition, the second switch 46 and charge capacitor 47 are connected to the first electrode part 40 respectively via the first switch 45 and wire 41.

The pulse power source 43 supplies a pulse voltage Vs of predetermined frequency and predetermined voltage to the amplifier 44, in response to a command from the grip determination device 8. The amplifier 44 amplifies the pulse voltage Vs supplied from the pulse power source 43, and applies it to the first electrode part 40.

The second switch 46 is a switching element which is turned ON/OFF by a drive circuit which is not illustrated. The drive circuit of this second switch 46 turns OFF the second switch 46 until the voltage VCref of the charge capacitor 47 reaches the threshold Vthr decided in advance, and turns ON the second switch 46 after the voltage VCref reaches the threshold Vthr, and discharges the charge stored in the charge capacitor 47.

The first switch 45 is a switching element which is turned ON/OFF by a drive circuit which is not illustrated. The drive circuit of this first switch 45 turns OFF the first switch 45 in response to rising of the pulse voltage Vs of the pulse power source 43. The pulse voltage supplied from the pulse power source 43 and amplifier 44 is applied to the first electrode part 40, the charge migrates through the path shown by the arrow 2a in FIG. 2, and the human body H and floating capacitor E are thereby charged.

In addition, the drive circuit of the first switch 45 turns ON the first switch 45 in response to rising of the pulse voltage Vs of the pulse power source 43. The human body H and floating capacitor E and the charge capacitor 47 are thereby connected, charge migrates through the path shown by the arrow 2b in FIG. 2 from the human body H and floating capacitor E to the charge capacitor 47, and the charge capacitor 47 is charged. The voltage VCref of the charge capacitor 47 thereby rises.

For this reason, when applying the pulse voltage to the first electrode part 40 by the pulse power source 43 and amplifier 44, charge and discharge of the human body H and floating capacitor E is alternately repeated, and the voltage VCref of the charge capacitor 47 gradually increases. At this time, the time until the voltage VCref of the charge capacitor 47 reaches the threshold Vthr (or pulse number of the pulse power source 43) varies according to the static capacitance Ch formed by the human body H, i.e. distance between the first electrode part 40 and body of the driver. In other words, in the case of part of the body of the driver contacting or approaching the arrangement position of the first electrode part 40 on the rim part 20, and the static capacitance Ch rising, the time taken until the voltage VCref of the charge capacitor 47 reaches the threshold Vthr shortens, and in the case of part of the body of the driver distancing from the arrangement position of the first electrode part 40 and the static capacitance Ch lowering, the time taken until the voltage VCref of the charge capacitor 47 reaches the threshold Vthr lengthens.

The static capacitance measurement unit 48 measures the time and pulse number until the voltage VCref of the charge capacitor 47 reaches the threshold Vthr, and measures the static capacitance Ch formed by the human body H existing in the vicinity of the first electrode part 40 indirectly based on this measurement result. The static capacitance measurement unit 48 sends a detection value Ch_1 of the static capacitance Ch obtained by the above sequence to the grip determination device 8.

Referring back to FIG. 2, the second proximity sensor 5 includes a second electrode part 50 provided to the rim part and a second detection circuit 52 electrically connected with this second electrode part 50. The second electrode part is a circular arc shape extending along the rim part 20, and is electrically conductive. The second electrode part 50 is provided inside of the rim part 20. The second electrode part 50 is arranged in the range of about 90° between 225° and 315° of the rim part 20 (i.e. range grippable mainly by the left hand of the driver). It should be noted that the arrangement position of the second electrode part 50 on the rim part 20 is also referred to as rim left part 20L below. The second detection circuit 52 is connected with the second electrode part 50 via the wire 51. The second detection circuit 52 detects the static capacitance between the second electrode part 50 and ground, as a value which varies according to the distance between the arrangement position of the second electrode part 50 and the human body. As the distance between the arrangement position of the second electrode part 50 and the human body approaches, the static capacitance between the second electrode part 50 and ground increases. The detection value Ch_2 of the static capacitance by the second detection circuit 52 is sent to the grip determination device 8. It should be noted that the circuit configuration of the second detection circuit 52 is substantially the same as the first detection circuit 42 shown in FIG. 2, and thus detailed explanation thereof is omitted.

The third proximity sensor 6 includes a third electrode part 60 provided to the rim part 20, and a third detection circuit 62 electrically connected with this third electrode part 60. The third electrode part 60 is a circular arc shape extending along the rim part 20, and is electrically conductive. The third electrode part 60 is provided inside of the rim part 20. The third electrode part 60 is arranged in a range of about 90° between 315° and 405° (45°) of the rim part 20 (i.e. range grippable by the right hand or left hand of the driver). It should be noted that the arrangement position of the third electrode part 60 of the rim part 20 is also referred to as rim upper part 20U hereinafter. The third detection circuit 62 is connected with the third electrode part 60 via a wire 61. The third detection circuit 62 detects the static capacitance between the third electrode part 60 and ground, as a value which varies according to the distance between the arrangement position of the third electrode part 60 and the human body. As the distance between the arrangement position of the third electrode part 60 and human body approaches, the static capacitance between the third electrode part 60 and ground increases. The detection value Ch_3 of static capacitance from the third detection circuit 62 is sent to the grip determination device 8. It should be noted that the circuit configuration of the third detection circuit 62 is substantially the same as the first detection circuit 42 shown in FIG. 2, and thus a detailed explanation is omitted.

The fourth proximity sensor 7 includes a fourth electrode part 70 provided to the rim part 20, and a fourth detection circuit 72 electrically connected with this fourth electrode part 70. The fourth electrode part 70 is a circular arc shape extending along the rim part 20, and is electrically conductive. The fourth electrode part 70 is provided inside of the rim part 20. The fourth electrode part 70 is arranged in a range of about 90° between 135° and 225° of the rim part 20 (i.e. grippable range by right hand or left hand of driver, and range of the rim part 20 closest to knees of driver). It should be noted that the arrangement position of the fourth electrode part 70 of the rim part 20 is also referred to as rim lower part 20D hereinafter. The fourth detection circuit 72 is connected with the fourth electrode part 70 via a wire 71. The fourth detection circuit 72 detects the static capacitance between the fourth electrode part 70 and ground as a value which varies according to the distance between the arrangement position of the fourth electrode part 70 and the human body. As the distance between the arrangement position of the fourth electrode part 70 and the human body approaches, the static capacitance between the fourth electrode part 70 and ground increases. The detection value Ch_4 of static capacitance from the fourth detection circuit 72 is sent to the grip determination device 8. It should be noted that the circuit configuration of the fourth detection circuit 72 is substantially the same as the first detection circuit 42 shown in FIG. 2, and thus a detailed explanation is omitted.

The grip determination device 8 determines the presence/absence of gripping of the rim part 20 by the driver, i.e. whether or not the driver is gripping the rim part 20, based on the detection values Ch_1, Ch_2, Ch_3, Ch_4 of the four proximity sensors 4 to 7 respectively arranged at different positions on the rim part 20 as mentioned above.

The grip determination device 8 includes: a selector 81 which selects a target sensor from among the four proximity sensors 4, 5, 6, 7 based on the change extent between predetermined times of the detection values Ch_1, Ch_2, Ch_3, Ch_4 of the four proximity sensors 4, 5, 6, 7; and a determinator 82 which determines the presence/absence of gripping of the rim part 20 by the driver based on the detection value of the target sensor selected by the selector 81.

Figure 3:
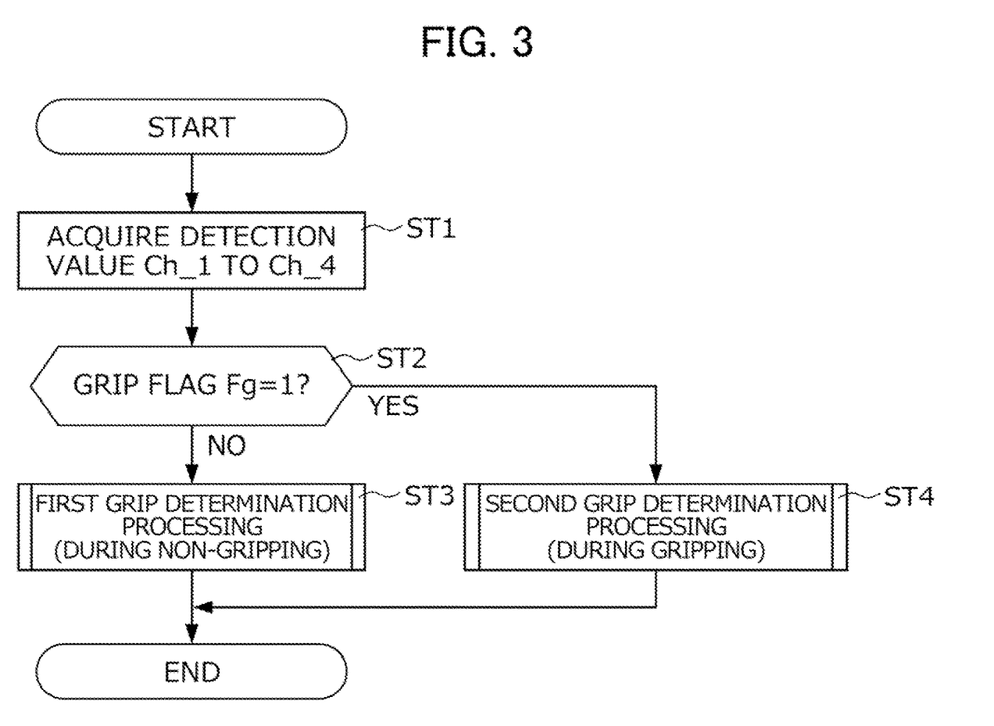
FIG. 3 is a flowchart showing a sequence of determining the presence/absence of gripping of a rim part by the driver, based on detection values of a plurality of proximity sensors in a grip determination device.

FIG. 3 is a flowchart showing a sequence of determining the presence/absence of gripping of the rim part by the driver based on the detection values Ch_1 to Ch_4 in the grip determination device 8. The processing shown in FIG. 3 is repeatedly executed under a predetermined control cycle in the grip determination device 8, in response to the vehicle being started up by the driver operating the start switch which is not illustrated.

First, in Step ST1, the selector 81 and determinator 82 acquires the detection values Ch_1 to Ch_4 of each proximity sensor 4 to 7, and then advances to Step ST2.

Next, in Step ST2, the determinator 82 determines whether the value of a grip flag Fg is "1". This grip flag Fg is a flag specifying that the driver is gripping the rim part 20 by hand, and is set to the value "0" in Step ST17 or ST24 described later, or is set to the value "1" in Step ST16 or ST23 described later.

The determinator 82, in the case of the determination result in Step ST2 being NO, i.e. in the case of the rim part 20 not being gripped in the previous control cycle, advances to Step ST3. In Step ST3, the determinator 82, after executing the first grip determination processing shown in FIG. 4 described later, ends the processing shown in FIG. 3. In addition, the determinator 82, in the case of the determination result of ST2 being YES, i.e. in the case of determining that the rim part 20 is gripped in the previous control cycle, advances to Step ST4. In Step ST4, the determinator 82, after executing second grip determination processing shown in FIG. 5 described later, ends the processing shown in FIG. 3.

Figure 4:
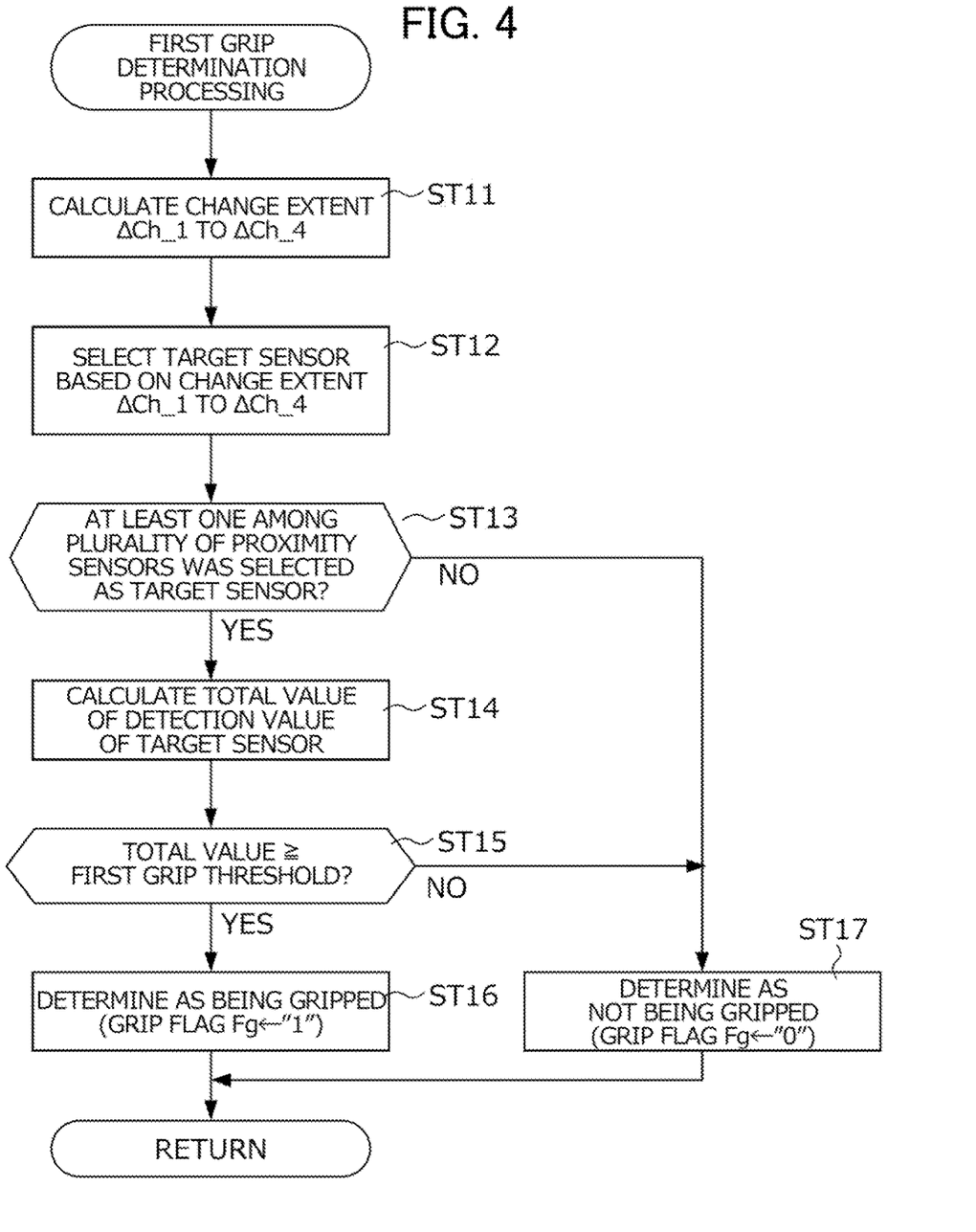
FIG. 4 is a flowchart showing a specific sequence of a first grip determination processing.

FIG. 4 is a flowchart showing a specific sequence of the first grip determination processing. First, in Step ST11, the selector 81 calculates change extents $\Delta Ch\_1$, $\Delta Ch\_2$, $\Delta Ch\_3$, $\Delta Ch\_4$ between predetermined times of the detection values Ch_1, Ch_2, Ch_3, Ch_4 of each proximity sensor 4 to 7, and then advances to Step ST12. More specifically, the selector 81 calculates change extents $\Delta Ch\_1$ to $\Delta Ch\_4$ of each proximity sensor 4 to 7 by subtracting the detection value Ch_1 to Ch_4 of the respective proximity sensors 4 to 7 acquired in the control cycle prior n cycles (n is an integer of 1 or more) from the detection values Ch_1 to Ch_4 of each proximity sensors 4 to 7 acquired in the current control cycle. Therefore, the change extents $\Delta Ch\_1$ to $\Delta Ch\_4$ calculated in Step ST11 correspond to the approaching amount, approaching rate, between predetermined times relative to the arrangement position of each electrode part 40 to 70 of a part of the body of the driver.

In Step ST12, the selector 81 selects a target sensor from among the plurality of proximity sensors 4 to 7 based on the change extents $\Delta Ch\_1$ to $\Delta Ch\_4$ of each proximity sensor 4 to 7 calculated in Step ST11, and then advances to Step ST13. More specifically, the selector 81 selects the sensor having a large change extent of the detection value from among the plurality of proximity sensors 4 to 7 as the target sensor. Herein, two examples of a specific sequence of selecting the target sensor from among the plurality of proximity sensors by the selector 81 will be explained.

In the first example, the selector 81 selects the target sensor by mutually comparing the magnitudes of the change extents $\Delta Ch\_1$ to $\Delta Ch\_4$ of the detection values of the plurality of proximity sensors 4 to 7. More specifically, the selector 81 selects an $M^{th}$ (M is an integer of 1 or greater and less than N) in descending order from the sensors having a large change extent $\Delta Ch\_1$ to $\Delta Ch\_4$ of all N number of proximity sensors 4 to 7 (N is an integer of 2 or greater, and is 4 in the present embodiment), as the proximity sensor. Therefore, in the first example, the $M^{th}$ in order from sensors having a large approaching rate to the arrangement position of each electrode part 40 to 70 of part of the body of the driver among the plurality of proximity sensors 4 to 7 is selected as the target sensor.

In the second example, the selector 81 selects a target sensor by comparing the change extent $\Delta Ch\_1$ to $\Delta Ch\_4$ of the detection values of the plurality of proximity sensors 4 to 7 with a predetermined selection threshold. More specifically, the selector 81 selects one having a change extent $\Delta Ch\_1$ to $\Delta Ch\_4$ larger than the selection threshold among the plurality of proximity sensors 4 to 7 as the target sensor. This selection threshold is a threshold decided relative to the change extent of the detection value of the proximity sensors 4 to 7 corresponding to the approaching rate to the arrangement position of each electrode part 40 to 70 of a part of the body of the driver as mentioned above. Therefore, in the second example, the one among the plurality of proximity sensors 4 to 7 having faster approaching rate to the arrangement position of each electrode part 40 to 70 of a part of the body of the driver than the rate according to the selection threshold.

In Step ST13, the determinator 82 determines whether at least one among the plurality of proximity sensors 4 to 7 in Step ST12 was selected as the target sensor. The determinator 82 advances to Step ST14 in the case of the determination result in Step ST13 being YES, and advances to Step ST17 in the case of being NO.

In Step ST14, the determinator 82 calculates the total amount of detection values of those among the plurality of proximity sensors selected as the target sensor, and advances to Step ST15. In Step ST15, the determinator 82 determines whether the total amount of detection values of the target sensor calculated in Step ST14 (i.e. in the case of there being one target sensor, detection value of this target sensor) is at least a first grip threshold decided in advance. This first grip threshold is the threshold value determined relative to the detection value of the proximity sensors 4 to 7, i.e. the static capacitance corresponding to the nearness of part of the body of the driver relative to the arrangement positions of each electrode part 40 to 70.

The determinator 82 advances to Step ST16 in the case of the determination result in Step ST15 being YES. In Step ST16, the determinator 82 determines that the rim part 20 is being gripped by the driver, and then ends the processing of FIG. 4. More specifically, in Step ST16, the determinator 82 sets the value of the grip flag Fg to "1", and then ends the processing of FIG. 4.

In addition, the determinator 82, in the case of the determination result in Step ST15 being NO, or in the case of the determination result in Step ST13 being NO, advances to Step ST17. In Step ST17, the determinator 82 determines that the rim part 20 is not being gripped by the driver, and then ends the processing of FIG. 4. More specifically, in Step ST17, the determinator 82 ends the processing of FIG. 4, while maintaining the value of the grip flag Fg at "0".

In the above way, the selector 81 repeatedly executes under a predetermined control cycle the selection processing (Steps ST11 to ST12 in FIG. 4) of selecting a target sensor from among the plurality of proximity sensors 4 to 7, while being determined that the rim part 20 is not being gripped by way of the determinator 82 (i.e. while the value of the grip flag Fg is set to "0"). In addition, the determinator 82 determines the presence/absence of gripping of the rim part 20 based on the detection value of only the one among the plurality of proximity sensors 4 to 7 selected as the target sensor by the above-mentioned selection processing, in the case of determining that the rim part 20 is not being gripped in the previous control cycle (i.e. case of the value of the grip flag Fg being set to "0").

Figure 5:
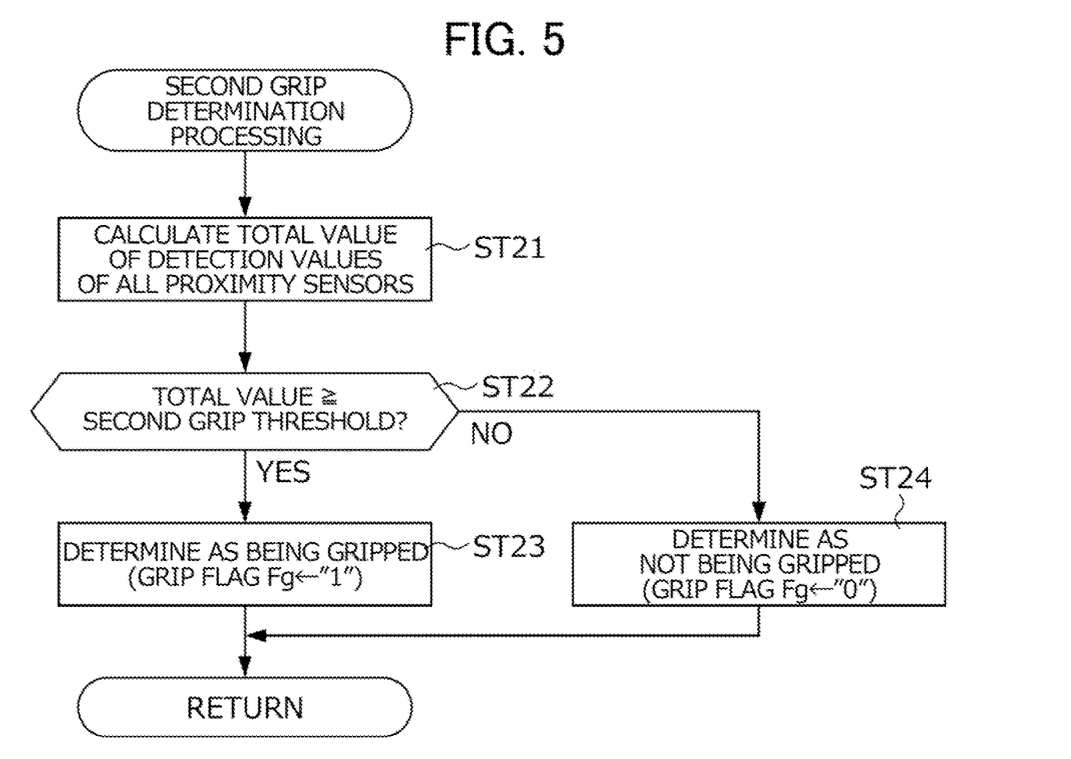
FIG. 5 is a flowchart showing a specific sequence of a second grip determination processing.

FIG. 5 is a flowchart showing a specific sequence of the second grip determination processing. First, in Step ST21, the determinator 82 calculates the total value of the detection values Ch_1 to Ch_4 of the plurality of proximity sensors 4 to 7, i.e. all proximity sensors 4 to 7 provided to the rim part 20, and then advances to Step ST22. In Step ST22, the determinator 82 determines whether or not the total value calculated in Step ST21 is at least a second grip threshold. This second grip threshold, similarly to the aforementioned first grip threshold, is a threshold determined relative to the detection values of the proximity sensors 4 to 7, i.e. the static capacitance corresponding to the nearness of part of the body of the driver relative to the arrangement position of each electrode part 40 to 70.

The determinator 82 advances to Step ST23 in the case of the determination result in Step ST22 being YES. In Step ST23, the determinator 82 determines that the rim part 20 is being gripped by the driver, and then ends the processing of FIG. 5. More specifically, in Step ST23, the determinator 82 ends the processing of FIG. 5, while maintaining the value of the grip flag Fg at "1".

In addition, the determinator 82 advances to Step ST24, in the case of the determination result in Step ST22 being NO. In Step ST24, the determinator 82 determines that the rim part 20 is not being gripped by the driver, and then ends the processing of FIG. 5. More specifically, in Step ST24, the determinator 82 sets the value of the grip flag Fg to "0", and then ends the processing of FIG. 5.

In the above way, the selector 81 determines the presence/absence of gripping of the rim part 20 based on the plurality of proximity sensors 4 to 7, i.e. the detection values of all proximity sensors 4 to 7 provided to the rim part 20, in the case of determining that the rim part 20 is being gripped in the previous control cycle (i.e. case of value of grip flag Fg being set to "1").

According to the steering device 1 related to the present embodiment, the following effects are exerted.

(1) The steering device 1 provides the plurality of proximity sensors 4 to 7 to the rim part 20 of the steering wheel 2 which can be gripped by the driver. Herein, in the case of the body build of the driver being larger than standard, a part of the body such as the abdomen or knees of the driver sitting in the driver seat may contact the rim lower part 20D. For this reason, the detection value Ch_4 of the fourth proximity sensor 7 arranged in the vicinity of this rim lower part 20D becomes steadily larger than reference; however, it does not charge greatly while driving. In contrast, the detection value of a proximity sensor arranged in the vicinity of a location where the driver grips by hand greatly changes every time the driver grips. Therefore, the selector 81 of the grip determination device 8 selects a target sensor from among the plurality of proximity sensors 4 to 7 based on the change extent $\Delta Ch\_1$ to $\Delta Ch\_4$ of the detection values Ch_1 to Ch_4 of the plurality of proximity sensors 4 to 7, and the determinator 82 of the grip determination device 8 determines the presence/absence of gripping based on the detection value of the selected target sensor. According to the steering device 1, since it is possible to exclude from being the target sensor a sensor for which the detection value increased due to the body build of the driver from among the plurality of proximity sensors 4 to 7, it is possible to determine the presence/absence of gripping of the rim part 20 appropriately, irrespective of the body build of the driver, and consequently can improve traffic safety.

(2) The selector 81 can select, as the target sensor, a sensor arranged in the vicinity of the location gripped by hand by the driver from among the plurality of proximity sensors 4 to 7, by selecting a target sensor from the plurality of proximity sensors 4 to 7 by mutually comparing the magnitudes of the change extent $\Delta Ch\_1$ to $\Delta Ch\_4$ of the detection values Ch_1 to Ch_4 of the plurality of proximity sensors 4 to 7.

(3) The selector 81 can select, as the target sensor, a sensor arranged in the vicinity of the location gripped by hand by the driver from among the plurality of proximity sensors 4 to 7, by selecting the $M^{th}$ in descending order from sensors having a large change extent among the N-number of proximity sensors 4 to 7 as the target sensor.

(4) The selector 81 can select, as the target sensor, a sensor arranged in the vicinity of the location gripped by hand by the driver from among the plurality of proximity sensors 4 to 7, by selecting the target sensor from among the plurality of proximity sensors 4 to 7 by comparing the change extent $\Delta Ch\_1$ to $\Delta Ch\_4$ of the detection values Ch_1 to Ch_4 of the plurality of proximity sensors 4 to 7 with the selection threshold, which is a threshold decided for this change extent.

(5) The selector 81 can select, as the target sensor, a sensor arranged in the vicinity of the location gripped by hand by the driver from among the plurality of proximity sensors 4 to 7, by selecting sensors among the plurality of proximity sensors 4 to 7 having the change extent $\Delta Ch\_1$ to $\Delta Ch\_4$ greater than the selection threshold, as the target sensor.

(6) The selector 81 can re-select the appropriate target sensor, every time the driver grips the rim part 20 again, and changes the grip location, by executing in a predetermined control cycle the selection processing of selecting a target sensor from among the plurality of proximity sensors 4 to 7, while determined by the determinator 82 as not being gripped.

(7) The determinator 82 can accurately determine the presence/absence of gripping by the driver, by determining the presence/absence of gripping of the rim part 20 based on the detection value of only one selected as the target sensor by the selector 81, in the case of determining the presence/absence of gripping of the rim part 20 every predetermined control cycle, and determining as not being gripped during the previous control cycle. In addition, the determinator 82, in the case of determining as being gripped during the previous control cycle, can determine the presence/absence of gripping appropriately, even in the case of the driver sliding the gripping location thereof while gripping the rim part 20, for example, by determining the presence/absence of gripping of the rim part based on the detection values of all proximity sensors 4 to 7 provided to the rim part 20.

(8) The determinator 82 can accurately determine that the driver is gripping the vicinity of an arrangement position of the target sensor, by determining that the rim part 20 is being gripped, in the case of the detection value of the target sensor being at least the first grip threshold, which is a threshold decided for this detection value.

(9) The determinator 82 determines that the rim part 20 is being gripped, in the case of the total value of detection values of the plurality of target sensors being at least the first grip threshold or second grip threshold, which are thresholds decided for this detection value. For example, it is thereby possible to accurately determine the presence/absence of gripping, even if the driver is gripping across the arrangement locations of the plurality of proximity sensors 4 to 7.

Although an embodiment of the present invention has been explained above, the present invention is not to be limited thereto. The configurations of detailed parts thereof may be modified as appropriate within the scope of the gist of the present invention.

For example, in the above embodiment, the four proximity sensors 4 to 7 are arranged on the rim part 20; however, the number of proximity sensors arranged on the rim part 20 is not limited thereto. So long as at least two proximity sensors are arranged on the rim part 20, the present invention can be applied.

What is claimed is:

1. A steering device comprising:
   a steering wheel which accepts a steering operation of a vehicle by a driver;
   a plurality of proximity sensors which is disposed to a grip part of the steering wheel which can be gripped by the driver, and outputs a detection value that varies according to a distance between each arrangement position and a human body; and
   a grip determination device which determines a presence of gripping of the grip part based on the detection value of the proximity sensors,
   wherein the grip determination device includes:
   a selector that selects a target sensor from among the plurality of the proximity sensors based on a change extent of the detection value of the plurality of the proximity sensors; and
   a determinator that determines a presence of gripping of the grip part based on the detection value of the target sensor.

2. The steering device according to claim 1, wherein the selector selects the target sensor by mutually comparing magnitudes of a change extent of a detection value of the plurality of the proximity sensors.

3. The steering device according to claim 2, wherein the selector selects, as the target sensor, an $M^{th}$ (M is an integer of 1 or greater and less than N) in descending order from proximity sensors having a large change extent among N-number (N is an integer of 2 or greater) of the proximity sensors.

4. The steering device according to claim 1, wherein the selector selects the target sensor by comparing a change extent of a detection value of the plurality of the proximity sensors with a selection threshold, which is a threshold decided for this change extent.

5. The steering device according to claim 4, wherein the selector selects a proximity sensor having a change extent greater than the selection threshold among the plurality of the proximity sensors as the target sensor.

6. The steering device according to claim 1, wherein the selector executes selection processing of selecting the target sensor from the plurality of the proximity sensors in a predetermined cycle, while the determinator is determining that the grip part is not being gripped.

7. The steering device according to claim 2, wherein the selector executes selection processing of selecting the target sensor from the plurality of the proximity sensors in a predetermined cycle, while the determinator is determining that the grip part is not being gripped.

8. The steering device according to claim 3, wherein the selector executes selection processing of selecting the target sensor from the plurality of the proximity sensors in a predetermined cycle, while the determinator is determining that the grip part is not being gripped.

9. The steering device according to claim 4, wherein the selector executes selection processing of selecting the target sensor from the plurality of the proximity sensors in a predetermined cycle, while the determinator is determining that the grip part is not being gripped.

10. The steering device according to claim 5, wherein the selector executes selection processing of selecting the target sensor from the plurality of the proximity sensors in a predetermined cycle, while the determinator is determining that the grip part is not being gripped.

11. The steering device according to claim 1, wherein the determinator determines presence of gripping of the grip part every predetermined cycle,
    determines presence of gripping of the grip part based on a detection value of only a proximity sensor selected as the target sensor among the plurality of the proximity sensors, in a case of determining that the grip part is not being gripped during a previous cycle, and
    determines presence of gripping of the grip part based on the detection values of the plurality of the proximity sensors, in a case of determining that the grip part is being gripped during a previous cycle.

12. The steering device according to claim 2, wherein the determinator determines presence of gripping of the grip part every predetermined cycle,
    determines presence of gripping of the grip part based on a detection value of only a proximity sensor selected as the target sensor among the plurality of the proximity sensors, in a case of determining that the grip part is not being gripped during a previous cycle, and
    determines presence of gripping of the grip part based on the detection values of the plurality of the proximity sensors, in a case of determining that the grip part is being gripped during a previous cycle.

13. The steering device according to claim 3, wherein the determinator determines presence of gripping of the grip part every predetermined cycle,
    determines presence of gripping of the grip part based on a detection value of only a proximity sensor selected as the target sensor among the plurality of the proximity sensors, in a case of determining that the grip part is not being gripped during a previous cycle, and
    determines presence of gripping of the grip part based on the detection values of the plurality of the proximity sensors, in a case of determining that the grip part is being gripped during a previous cycle.

14. The steering device according to claim 4, wherein the determinator determines presence of gripping of the grip part every predetermined cycle,
    determines presence of gripping of the grip part based on a detection value of only a proximity sensor selected as the target sensor among the plurality of the proximity sensors, in a case of determining that the grip part is not being gripped during a previous cycle, and
    determines presence of gripping of the grip part based on the detection values of the plurality of the proximity sensors, in a case of determining that the grip part is being gripped during a previous cycle.

15. The steering device according to claim 5, wherein the determinator determines presence of gripping of the grip part every predetermined cycle,
    determines presence of gripping of the grip part based on a detection value of only a proximity sensor selected as the target sensor among the plurality of the proximity sensors, in a case of determining that the grip part is not being gripped during a previous cycle, and
    determines presence of gripping of the grip part based on the detection values of the plurality of the proximity sensors, in a case of determining that the grip part is being gripped during a previous cycle.

16. The steering device according to claim 1, wherein the determinator determines that the grip part is being gripped, in a case of a detection value of the target sensor being at least a grip threshold, which is a threshold decided for this detection value.

17. The steering device according to claim 1, wherein the determinator determines that the grip part is being gripped, in a case of a total value of detection values of the plurality of the proximity sensors being at least a grip threshold, which is a threshold decided for this detection value.

* * * * *